(12) United States Patent
Wilson et al.

(10) Patent No.: US 8,855,177 B1
(45) Date of Patent: Oct. 7, 2014

(54) SYSTEMS AND METHODS FOR MITIGATING RADIO FREQUENCY INTERFERENCE

(75) Inventors: Arlynn Wayne Wilson, Huntsville, AL (US); Kent E. Darzi, New Market, AL (US); Philip David Williams, Madison, AL (US)

(73) Assignee: ADTRAN, Inc., Huntsville, AL (US)

(*) Notice: Subject to any disclaimer, the term of this patent is extended or adjusted under 35 U.S.C. 154(b) by 570 days.

(21) Appl. No.: 12/950,377

(22) Filed: Nov. 19, 2010

(51) Int. Cl.
*H04B 1/38* (2006.01)

(52) U.S. Cl.
USPC .......... 375/222; 375/219; 375/220; 375/229; 375/295; 375/316

(58) Field of Classification Search
CPC ... H04L 27/2601; H04L 1/04; H04L 25/0216; H04L 27/0004; H04L 27/2614; H04L 27/2626; H04L 5/0023; H04L 5/023; H01Q 1/246; H01Q 3/2611; H04B 2201/70706; H04B 7/086; H04B 1/1036; H04W 16/24
USPC ......... 375/219, 220, 222, 229, 260, 272, 295, 375/316, 340, 342, 350
See application file for complete search history.

(56) References Cited

U.S. PATENT DOCUMENTS

| | | | | |
|---|---|---|---|---|
| 6,404,830 B2* | 6/2002 | Wiese et al. | .................. | 375/346 |
| 7,003,094 B2 | 2/2006 | Fischer et al. | | |
| 7,471,931 B2* | 12/2008 | Wilson | ............................ | 455/88 |
| 7,542,531 B2* | 6/2009 | Lin et al. | ....................... | 375/346 |
| 7,573,943 B2 | 8/2009 | Cioffi | | |
| 2004/0114503 A1* | 6/2004 | Schneider et al. | ............ | 370/201 |
| 2005/0074079 A1* | 4/2005 | Jin | ................. | 375/346 |
| 2006/0039454 A1 | 2/2006 | Cioffi | | |
| 2006/0120302 A1* | 6/2006 | Poncini et al. | ................ | 370/254 |
| 2006/0215775 A1* | 9/2006 | Lin et al. | ....................... | 375/260 |
| 2008/0165754 A1* | 7/2008 | Hu | ................. | 370/342 |
| 2011/0055884 A1* | 3/2011 | Beattie et al. | ................ | 725/110 |
| 2011/0274101 A1* | 11/2011 | Cooper | ........................ | 370/338 |
| 2012/0026908 A1* | 2/2012 | Tzannes et al. | ............... | 370/252 |

FOREIGN PATENT DOCUMENTS

EP 0428170 11/1990

* cited by examiner

*Primary Examiner* — Hirdepal Singh
(74) *Attorney, Agent, or Firm* — Maynard Cooper & Gale, P.C.; Jon E. Holland (57) ABSTRACT

Embodiments of the present disclosure generally pertain to systems and methods for reducing RF interference in communication systems. A communication system in accordance with an exemplary embodiment of the present disclosure comprises an element management system (EMS) communicating through a network with a plurality of network access devices. The EMS is configured to manage at least one network access device such that the device refrains from communicating data or reduces a data rate within a frequency range of a nearby interferer during time periods when interfering activity of the interferer is increased. Accordingly, the effects of RF interference for signals communicated by the device is reduced and degradation of service is prevented to an extent.

27 Claims, 5 Drawing Sheets

SYSTEMS AND METHODS FOR MITIGATING RADIO FREQUENCY INTERFERENCE

RELATED ART

Network service providers utilize digital subscriber line (DSL) technologies to provide broadband services over existing telephone subscriber lines, such as twisted-wire pairs, to customer premises. Various high-speed DSL technologies, such as, for example, asymmetric DSL (ADSL) and very-high-speed DSL (VDSL), use discrete multitone (DMT) modulation in order to adapt to the characteristics of the subscriber line. A DMT signal is divided into a plurality of tones, with each tone representing a discrete segment of the signal's frequency spectrum.

Radio Frequency (RF) signals transmitted by interferers, such as amplitude modulation (AM) radio stations, in close proximity to and in the same frequency range as the DMT signal may cause RF interference, which can contribute to deterioration in DSL system performance. For example, ADSL operates in the frequency range of about 138 kilohertz (kHz) to 1.1 Megahertz (MHz), while AM radio stations in the United States operate in the frequency range of about 540 kHz to 1.7 MHz. Such a large overlap in frequency ranges is a major source of RF interference in DMT systems, particularly along the portion of the subscriber line closest to the customer premises, due to signal attenuation along the subscriber line and the high number of AM radio stations dispersed throughout the United States. Accordingly, systems and methods for reducing RF interference in DSL communication systems are desired.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for reducing RF interference in communication systems. A communication system in accordance with an exemplary embodiment of the present disclosure comprises an element management system (EMS) communicating through a network with a plurality of network access devices. The EMS is configured to manage at least one network access device such that the device refrains from communicating data or reduces a data rate within a frequency range of a nearby interferer during time periods when interfering activity of the interferer is increased. Accordingly, the effects of RF interference for signals communicated by the device are reduced, and degradation of service is prevented to an extent.

Figure 1:
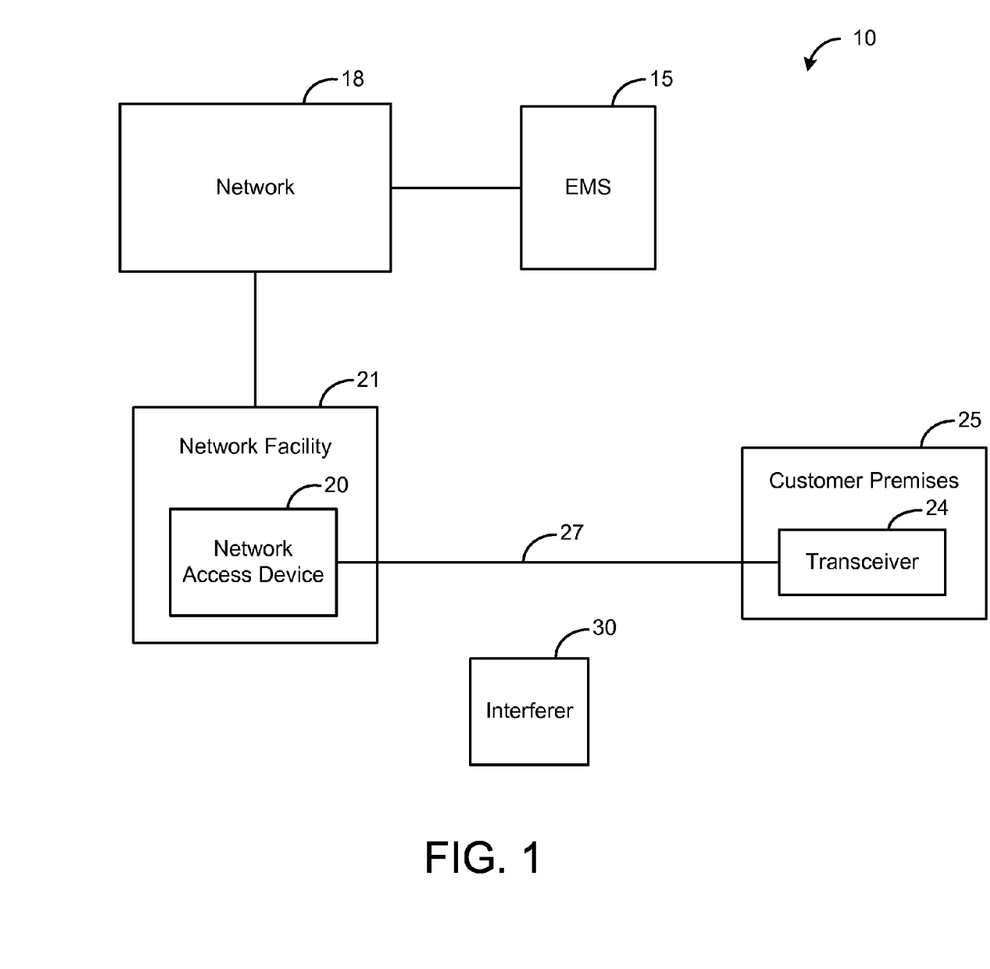
FIG. 1 is a block diagram depicting an exemplary embodiment of a communication system.

FIG. 1 depicts an exemplary communication system 10. In one embodiment, the communication system 10 comprises an EMS 15 communicating through a network 18 with a network access device 20 located at a network facility 21, such as a central office. In other embodiments, the network access device 20 may be located at any network location, such as an intermediate point between the network facility 21 and a customer premises 25. The EMS 15 is configured to manage the network access device 20 based upon specific data, as will be described in more detail hereafter. An exemplary EMS is described in detail in commonly-assigned U.S. Pat. No. 7,363,360, entitled "System and Method for Managing Elements of a Communication Network," and issued on Apr. 22, 2008, which is incorporated herein by reference.

The network access device 20 is coupled to a transceiver 24 at the customer premises 25 via a subscriber line 27. In one exemplary embodiment, the subscriber line 27 comprises at least one twisted-wire pair, but other types of communication media are possible in other embodiments. The network access device 20 is configured to transmit a signal, such as, for example, a DSL signal, to the transceiver 24 across the subscriber line 27. In one exemplary embodiment, the device 20 transmits the signal within a defined frequency range using discrete multitone (DMT) modulation, although other modulation formats are possible. A DMT signal is divided into a plurality of closely-spaced tones, or discrete frequency ranges, in order to transmit the data associated with the signal. The signal data is broken down and transmitted through a plurality of small, parallel data streams, one for each tone. Furthermore, each tone is modulated at a relatively low data rate such that the aggregate data rate of all of the tones comprising the entire signal is the DMT signal's effective data rate. In one exemplary embodiment, a DMT signal is transmitted according to an asymmetric DSL (ADSL) format and operates at frequencies in the range of about 138 kilohertz (kHz) to 1.1 Megahertz (MHz). The DMT signal is divided into 256 tones, each of which occupies a discrete frequency range of approximately 4.3125 kHz. However, other types of DMT signals having a different number of tones occupying a different frequency range are possible in other embodiments.

An interferer 30, such as an AM radio station, transmits radio frequency (RF) signals that may permeate areas in which the DMT signal operates. If the interferer 30 is in close proximity to the network access device 20 and the RF signals transmitted by the interferer 30 are at frequencies within the frequency range of the DMT signal, the RF signals interfere with the DMT signal increasing its signal-to-noise ratio and adversely affecting the performance of the DMT signal. Furthermore, such interference may vary based on the time of day if the interferer 30 only transmits RF signals for a specific period of time each day or if the interferer 30 varies its transmit power for certain periods of time each day. In one exemplary embodiment, the interferer 30 comprises an AM radio station which transmits signals at frequencies in the range of 540 kHz to 1.7 MHz in close proximity to the network access device 20. If the DMT signal is transmitted according to an ADSL format, the DMT signal may experience RF interference from the interferer 30 at particular frequencies within the frequency range of 540 kHz to 1.1 MHz. Such interference degrades the DMT signal before it arrives at the customer premises 25, adversely affecting the quality of the DMT signal received by the transceiver 24. In one exemplary embodiment, as will be described in more detail hereafter, the occurrence of RF interference at a specific frequency is detected, and the tone encompassing such frequency is removed from the DMT signal or otherwise adjusted prior to its transmission. As an example, the data rate of the tone may be decreased if a significant amount of RF interference for the tone is expected.

Figure 2:
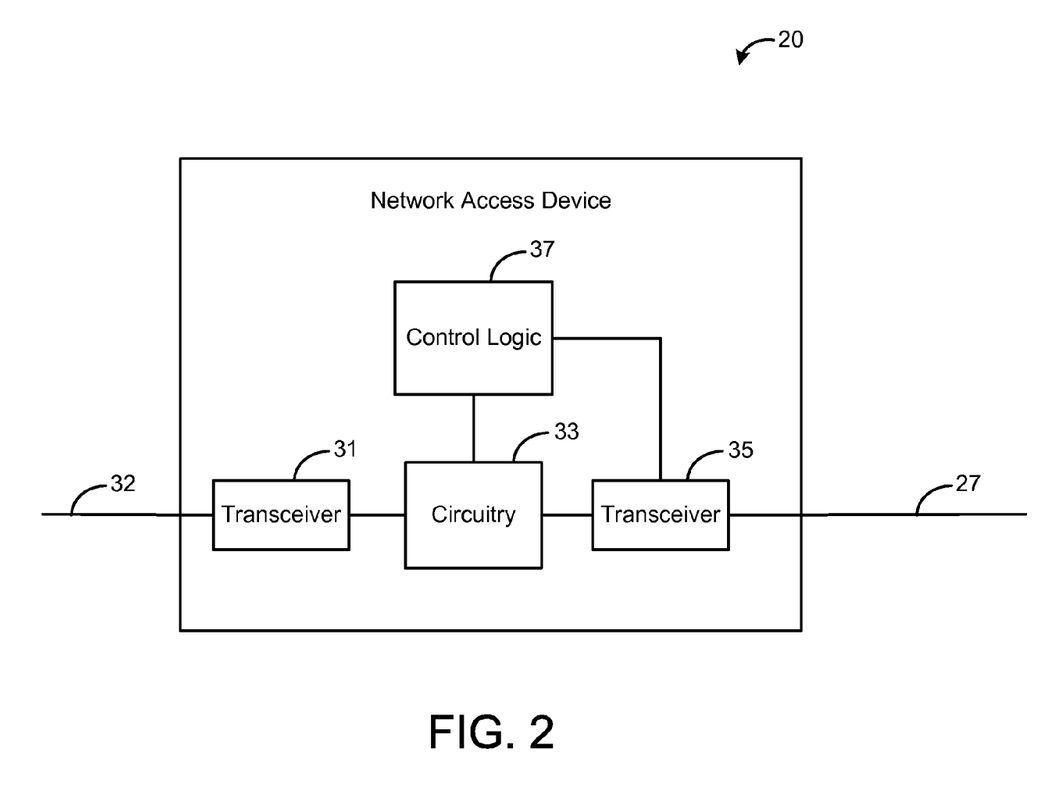
FIG. 2 is a block diagram depicting an exemplary embodiment of a network access device, such as is depicted by FIG. 1.

FIG. 2 depicts an exemplary embodiment of the network access device 20 of FIG. 1. The network access device 20 comprises a transceiver 31 coupled to a network connection 32 and a transceiver 35 coupled to the subscriber line 27. Data from the network 18 is received by the transceiver 31 from the connection 32, and circuitry 33 processes the data, as may be desired. As an example, the network access device 20 may implement a switch or a DSL access multiplexer (DSLAM), and the circuitry may forward data based on a forwarding table (not specifically shown). In this regard, the network access device 20 may comprise additional transceivers (not shown) coupled to additional subscriber lines (not shown), and the circuitry 33 may forward data packets to the transceivers via techniques known in the art. Data destined for the customer premises (CP) transceiver 24 (FIG. 1) is forwarded to the transceiver 35 by the circuitry 33.

The transceiver 35 is configured to modulate tones of a DMT signal with data received from the circuitry 33 and transmit the modulated DMT signal to the transceiver 24 (FIG. 1) located at the customer premises 25 (FIG. 1). The transceiver 35 is further configured to receive a modulated DMT signal from the CP transceiver 24 via the subscriber line 27 and to demodulate the received DMT signal to recover the data carried by such signal. The transceiver 35 transmits such data to the circuitry 33, which forwards the data to the transceiver 31 for transmission to the network 18 via the connection 32.

The network access device 20 further comprises control logic 37 coupled to the transceiver 35 and to the circuitry 33. The control logic 37 is configured to control the operation of the transceiver 35 based on information received from the EMS 15. Note that the control logic 37 may be implemented in hardware, software, firmware, or any combination thereof. In one exemplary embodiment, the control logic 37 is implemented in software and stored within memory (not shown) of the device 20. In such an embodiment, the network access device 20 comprises an instruction execution apparatus, such as a central processing unit (CPU) or digital signal processor (DSP), for executing instructions of the software.

In one exemplary embodiment, the control logic 37 is configured to receive a control signal from the EMS 15 indicating whether significant RF interference is expected for the DMT signal transmitted by the transceiver 35 during a time period. Such determination by the EMS 15 is based upon interferer data and network device data accessible to the EMS 15, as will be described in more detail hereafter. If the control logic 37 receives a signal from the EMS 15 indicating that significant RF interference by a particular interferer 30 (FIG. 1) is expected, the control logic 37 prevents the transceiver 35 from transmitting data across the subscriber line 27 via the tone encompassing the frequency at which the interferer 30 operates, thereby avoiding significant RF interference. Thus, the transceiver 35 transmits a DMT signal, without the tone at risk of suffering from such RF interference, across the subscriber line 27 to the transceiver 24. Removing the tone to prevent RF interference causes a drop in the power output of the signal over the frequency range associated with that tone, which will be referred to hereafter as a "notch," and the process of removing the tone will be referred to hereafter as "notching out" such portion of the signal. By notching out a tone that would likely experience significant RF interference prior to transmitting the signal to the transceiver 24 at the customer premises 25, RF interference is reduced.

As an alternative, rather than notching out the tone expected to be affected by the RF interference, the EMS 15 may be configured to lower the data rate of such tone. Lowering the data rate can help reduce errors and thus help the DMT signal to better withstand the RF interference. However, if the RF interference is extremely high, it may be preferable to notch out the tone altogether. Thus, the decision of how to adjust the affected tone may be based on the level of RF interference expected.

Figure 3:
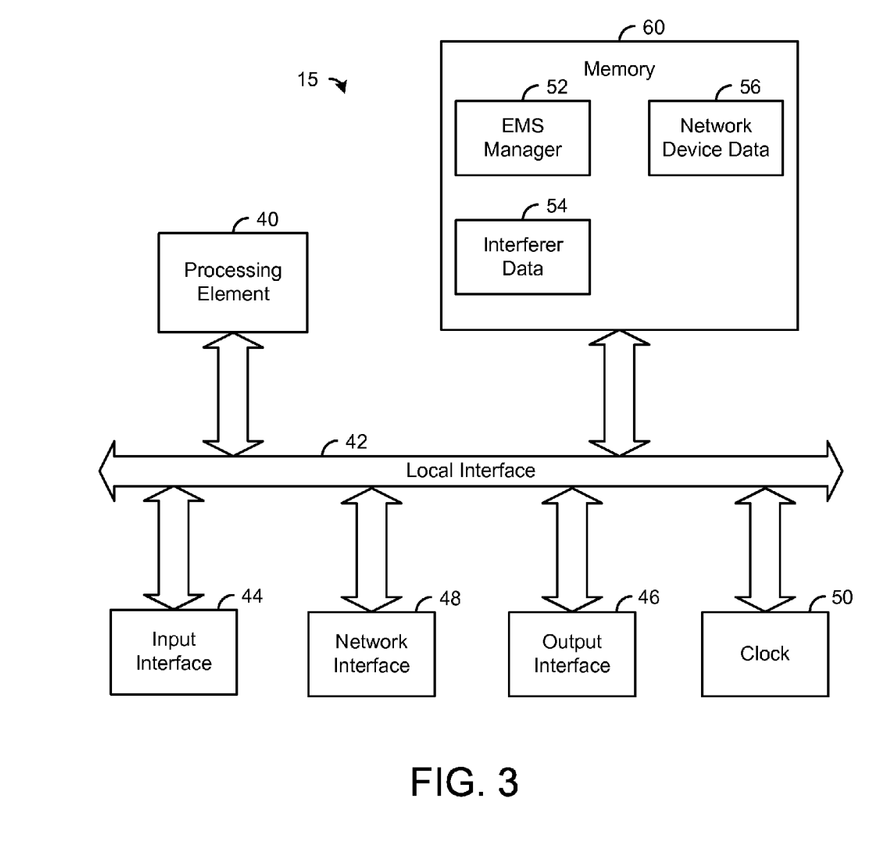
FIG. 3 is a block diagram depicting an exemplary embodiment of an element management system, such as is depicted by FIG. 1.

FIG. 3 depicts an exemplary embodiment of the EMS 15 of FIG. 1. The EMS 15 of FIG. 3 comprises at least one conventional processing element 40, such as a central processing unit (CPU), that communicates to and drives the other elements within the EMS 15 via a local interface 42. Furthermore, an input interface 44 for example, a keyboard or a mouse, can be used to input data from a user of the EMS 15, and an output interface 46, for example, a printer or monitor, can be used to output data to the user. Also, a network interface 48 allows the EMS 15 to communicate with the network 18 (FIG. 1), and a clock 50 allows the EMS 15 to track time of day in order to effectively manage the network access device 20 (FIG. 2), as will be further described below.

The EMS 15 further comprises an EMS manager 52. The EMS manager 52 is configured to manage network devices, such as the network access device 20, based on various data. In one exemplary embodiment, the EMS manager 52 manages the network access device 20 based on the clock 50 and on interferer data 54 and network device data 56 stored in memory 60 of the EMS 15. It should be noted that the EMS manager 52 can be implemented in software, hardware, firmware or any combination thereof. In the exemplary embodiment illustrated in FIG. 3, the EMS manager 52 is implemented in software and stored in memory 60 of the EMS 15.

Note that the EMS manager 52 and/or the control logic 37 (FIG. 2), when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

In one embodiment, the interferer data 54 indicates transmission characteristics of the interferer 30 and the network device data 56 indicates transmission characteristics of the network access device 20. Based on such characteristics, the EMS manager 52 predicts an amount of interference likely to affect the DMT signal transmitted by the network access device 20 across the subscriber line 27 during a particular time period. If the EMS manager 52 deems the estimated amount of interference to be excessive during such time period, then the EMS manager 52 controls the network access device 20 such that the tone or tones affected by the excessive interference are notched out or otherwise adjusted during such time period.

In one exemplary embodiment, the interferer data 54 indicates the location (e.g., the latitude and longitude coordinates) of the interferer 30, the interferer's frequency range, the interferer's transmit power, the interferer's direction of transmission, and the interferer's times of transmission. In some cases, the transmit power may vary over time. In one exemplary embodiment, the interferer data 54 indicates the transmit power as a function of time. As an example, the data 54 may define a transmit power schedule that indicates the interferer's transmit power over time, such as a daily or weekly schedule. The interferer data 54 may be analyzed to determine the interferer's expected transmit power at any given time. The interferer data 54 may be provisioned by a service provider or accessed from a database.

The network device data 56 indicates the location (e.g., the latitude and longitude coordinates) of the network access device 20, as well as the frequency range of each tone of the DMT signal transmitted by the device. Such data 56 may be manually entered by a user or automatically determined by the EMS 15 based on related data communicated with the network access device 20 or otherwise. As an example, the EMS 15 may communicate with the network access device 20 via the network 18 to learn the frequency ranges of the tones transmitted by the device 20.

Based on the interferer data 54 and the network device data 56, the EMS manager 52 determines a value, referred to as an "interference value," indicating the predicted level of RF interference that the interferer 30 is likely to cause in the DMT signal transmitted by the device 20 during a time period. For example, if the interferer 30 is in close proximity to the network access device 20 and transmits at a high power within the frequency range of the DMT signal, the interference value will likely be relatively high. However, if the interferer 30 is either a substantial distance from the device 20 or is in close proximity to the device 20 but transmits at a low power within the frequency range of the DMT signal, the interference value will likely be relatively low. In one exemplary embodiment, the EMS manager 52 accesses the interferer data 54 and the network device data 56 and calculates the interference value based on such data 54 and 56. In such embodiment, the EMS manager 52 utilizes the location, transmit power, and direction of transmission of the interferer 30, as well as the expected attenuation of the interferer's RF signal, in order to determine the power of the interferer's RF signal at the location of the network access device 20. Based on the power of the RF signal at the location of the network access device 20, the EMS manager 52 calculates the interference value. As an example, the interference value may be the expected power level of the RF signal at the network access device 20 or other point along the subscriber line 27. In another example, the interference value may be a ratio of such expected power level of the RF signal at the network access device 20 and the expected transmit power of the transceiver 35. Other types of interference values are possible in other embodiments.

Note that the power level of the RF signal is less than the transmit power of the interferer 30 due to attenuation of the RF signal as it travels through the atmosphere. In calculating the interference value, various factors such as time of day may be a factor. For example, attenuation of RF signal is generally less at night, and such information may be used to determine a more precise interference value. Yet other factors may be considered in calculating the interference value in other embodiments.

In addition, the interference value may be relative to any point associated with the signal transmitted by the transceiver 35. For example, the interference value may indicate the amount of interference introduced at the transceiver 35, as described herein. However, the interference value may be relative to any point along the subscriber line 27. As an example, the location of the CP transceiver 24 may be used for determining the interference value rather than the location of the transceiver 35. Various other changes and modifications would be apparent to one of ordinary skill upon reading this disclosure.

In another exemplary embodiment, the EMS manager 52 accesses the interference value from a table (not shown). Such table may indicate a plurality of expected interference values based on the distance between the interferer 30 and the network device 20, the power at which the interferer 30 transmits, and/or other factors. Yet other techniques for determining the interference value from various interferer data 54 and network device data 56 are possible in other embodiments.

Once the EMS manager 52 determines the interference value, the EMS manager 52 compares the interference value to a predefined threshold in order to determine whether significant RF interference in the DMT signal is expected. An interference value exceeding the threshold indicates that significant RF interference is expected, but an interference value at or below the threshold indicates that significant RF interference is not expected. If the interference value exceeds the threshold such that the EMS manager 52 determines that significant RF interference is expected during a specific time period, the EMS manager 52 accesses the clock 50 to determine whether the current time falls within such time period such that significant RF interference is currently expected. If significant RF interference is not currently expected, the EMS manager 52 does not limit, based on the interferer 30, the tones transmitted by the network access device 20. If significant RF interference is currently expected, the EMS manager 52 transmits a message to the control logic 37 (FIG. 2) of the device 20 instructing the control logic 37 to notch out or otherwise adjust the tone or tones affected by such RF interference. The control logic 37 then controls the transceiver 35 to notch out or otherwise adjust the tone or tones of the DMT signal indicated by the message.

There are various techniques that can be used to notch out a tone of a DMT signal. As an example, many DMT transceivers define a transmission mask indicating the transmit power of the transceiver across a range of frequencies. In one embodiment, the control logic 37 notches out a tone by adjusting the transmission mask such that the transmit power for such tone is lowered close to zero. Thus, very little power, if any, is transmitted by the transceiver 35 in the frequency range of the notched out tone.

Once the RF interference is predicted to abate such that it no longer exceeds the threshold, the EMS manager 52 communicates with the control logic 37 such that the logic 37 frees the transceiver 35 of the restrictions imposed due to the RF interference. As an example, if a tone was notched out due to the expected level of interference from the interferer 30, the transceiver 35 begins to transmit such tone again. If the data rate of a tone was decreased due to the expected level of interference from the interferer 30, the data rate of such tone is increased. Note that multiple interferers 30 can cause significant RF interference in the same DMT signal. In such instance, multiple tones may be notched out or otherwise adjusted at the same time in order to reduce RF interference, as described above.

In one exemplary embodiment, the EMS manager 52 is configured to adjust a tone or tones affected by the RF interference depending on the level of interference expected. As an example, the EMS manager 52 may compare the interference value to multiple thresholds. If the interference value exceeds one threshold but not the other, the EMS manager 52 may be configured to lower the data rate for the affected tone or tones. However, if both thresholds are exceeded, the EMS manager 52 may be configured to notch out the tone or tones such that no data is carried in the frequency range of such tone or tones.

Accordingly, if the expected level of RF interference is extremely high, the affected tone or tones are notched out, but if the expected level of interference is marginal, the data rate of the affected tone or tones is reduced.

Figure 4:
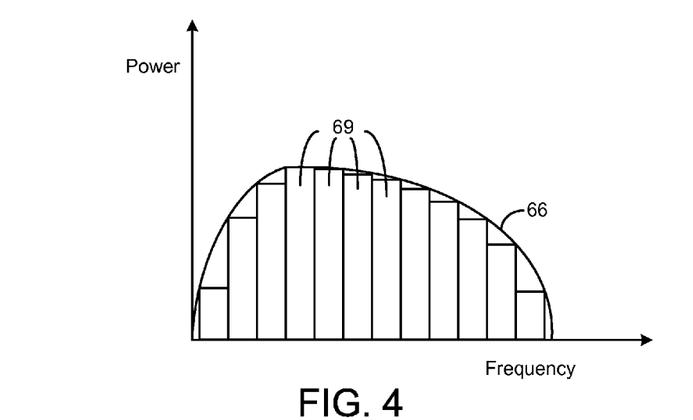
FIG. 4 is a graph depicting an exemplary power spectral density curve for a DMT signal transmitted by the exemplary communication system of FIG. 1.
Figure 5:
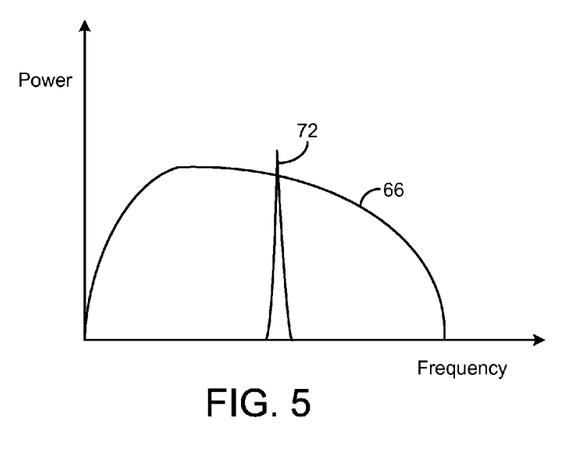
FIG. 5 is a graph depicting RF interference in the frequency range of the power spectral density curve of FIG. 4.

FIG. 4 depicts a power spectral density (PSD) curve 66 of a DMT signal divided into a plurality of tones 69. Although FIG. 4 depicts only twelve tones 69 for illustrative purposes, other numbers of tones 69 are possible. For example, a typical DMT signal transmitted according to an ADSL format comprises 256 tones 69. Each tone 69 occupies a discrete frequency range and is capable of transmitting a small data stream which is a portion of the overall signal. As an example, a typical tone 69 in a DMT signal transmitted according to an ADSL format occupies a discrete frequency range approximately 4.3125 kHz in width. As shown by FIG. 5, the DMT signal may experience significant RF interference 72 caused by an interferer 30 (FIG. 1) in close proximity to the network access device 20 (FIG. 1) transmitting at a relatively high power at a specific frequency within the frequency range of the signal, as described in detail above. Such significant RF interference 72 adversely affects the performance of the DMT signal and contributes to degradation of service at the customer premises 25 (FIG. 1).

Figure 6:
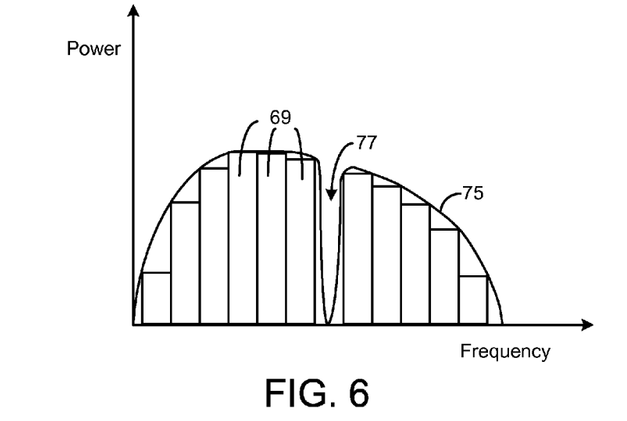
FIG. 6 is a graph depicting a modified power spectral density curve having a notch such that less data is communicated within a frequency range of the RF interference.

Based on the interferer data 54 (FIG. 3) and the network device data 56 (FIG. 3), the EMS 15 (FIG. 3) determines an interference value indicating the amount of estimated RF interference affecting the DMT signal and manages the network access device 20 (FIG. 2) such that the device 20 notches out or otherwise adjusts the tone 69 encompassing the specific frequency of the interferer 30 if the interference value exceeds a threshold, as described above. FIG. 6 depicts a modified PSD curve 75 having a notch 77 wherein the spectral density of the signal is controlled such that no data is communicated within the frequency range of the tone 69 notched out by the device 20. When notching out the tone 69 having a high risk of suffering from significant RF interference 72 (FIG. 5), the network access device 20 may increase the data rates transmitted by other tones 69, which are affected less or not affected by the interference. Alternatively, the overall data rate of the DMT signal may be reduced. In either case, the DMT signal is transmitted with less error thereby mitigating the effects of the RF interference.

In various embodiments described above, the EMS manager 52 is described as calculating an interference value and then determining how to adjust a tone or tones of a DMT signal based on such value. However, calculation of such an interference value is unnecessary in at least some embodiments. For example, it is possible for a technician or other user to manually determine when a tone or tones is to be adjusted based on interference from the interferer 30. The user may then provision the interferer data 54 to indicate how and when a tone or tones are to be adjusted. As an example, the user may define a schedule (e.g., daily or weekly) identifying which tone or tones are to be adjusted and when they are to be adjusted. Such data 54 may also indicate how the tones are to be adjusted, such as whether they are to be notched out or whether their data rate is to be reduced.

In addition, if desired, the data 54 and/or 56 used to determine when to adjust a tone or tones of the DMT signal may be stored local to the network access device 20. In such an example, the control logic 37 may access the data 54 and/or 56 and determine when and how to adjust a tone or tones of the DMT signal. Yet other configurations are possible in other embodiments.

In one exemplary embodiment, assume that the network access device 20 transmits a DMT signal according to an ADSL format having a frequency range of about 138 kHz to 1.1 MHz across the subscriber line 27 to the transceiver 24 at the customer premises 25. Also assume that the DMT signal is divided into 256 tones 69, each tone 69 approximately 4.3125 kHz wide. Further assume that an interferer 30 is in close proximity to the subscriber line 27, and the interferer 30 transmits an RF signal at a frequency of 900 kHz from 8:00 A.M. to 6:00 P.M. each day but transmits no signal between 6:00 P.M. and 8:00 A.M.

Figure 7:
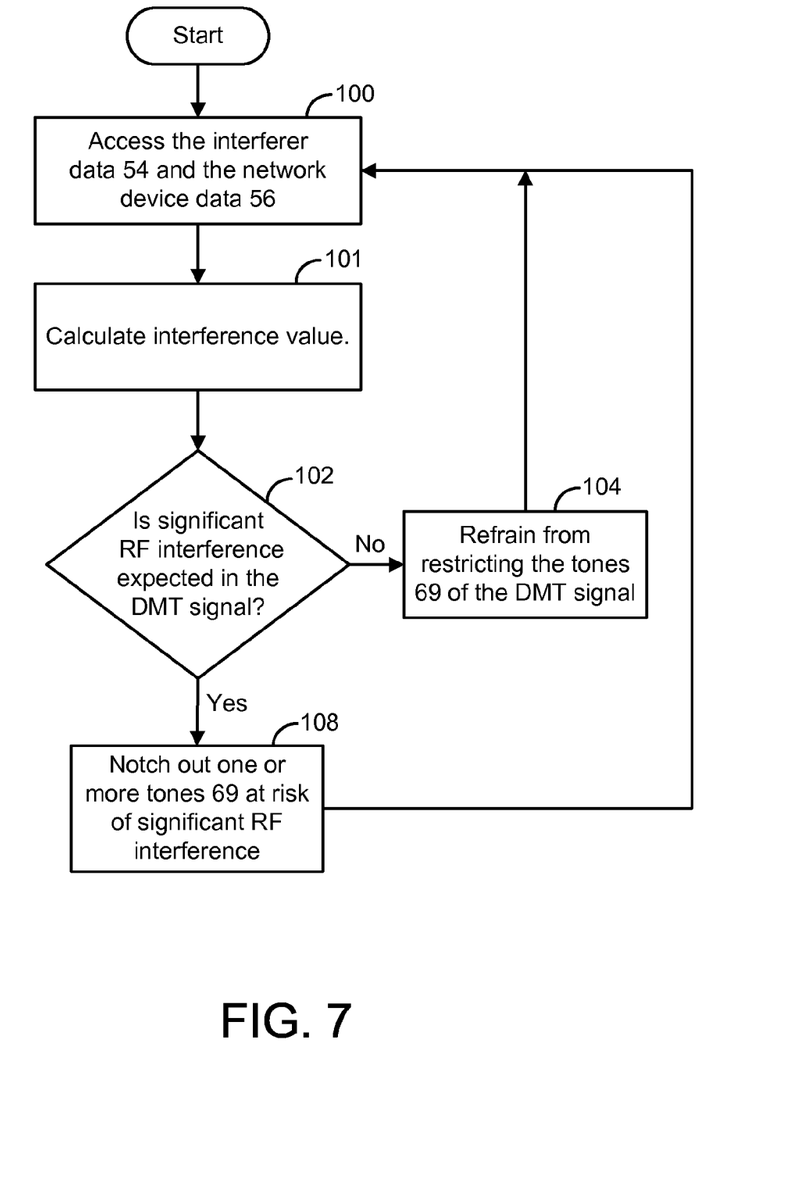
FIG. 7 is a flowchart illustrating an exemplary method of reducing RF interference in a communication system.

The EMS manager 52 accesses the interferer data 54 and the network device data 56, as shown by block 100 of FIG. 7, and, based on such data 54 and 56, calculates an interference value indicating the expected amount of RF interference from the interferer 30 in the DMT signal transmitted by the network access device 20 for the time indicated by the clock, as shown by block 101. For illustrative purposes, assume that the time is around 8:00 A.M. such that the interferer 30, as indicated by the interferer data 54, is expected to be transmitting an RF signal at 900 KHz.

The EMS manager 52 compares the interference value to a specified threshold to determine whether the interferer 30 is currently expected to cause significant RF interference in the DMT signal, as shown by block 102. That is, if the interference value exceeds the threshold, then the EMS manager 52 determines that significant RF interference is expected. Otherwise, the EMS manager 52 determines that significant RF interference is not expected. For illustrative purposes, assume that the distance between the network access device 20 and the interferer 30 and the current transmit power of the interferer 30 are such that the calculated interference value exceeds the threshold. In such case, the EMS manager 52 instructs the control logic 37 located in the network access device 20 to notch out one or more tones 69 affected by the RF interference. In this regard, the EMS manager 52 transmits through the network 18 a message identifying the tone or tones 69 to be notched out. In response, the control logic 37 controls the transceiver 35 such that the identified tone or tones 69 are notched out of the DMT signal transmitted across the subscriber line 27, as shown by block 108. Accordingly, the RF signal transmitted by the interferer 30 should not have a significant impact on the signal quality of the DMT signal.

According to FIG. 7, the identified tone or tones 69 continue to be notched out until 6:00 P.M. at which time it is expected that the interferer 30 stops transmitting the RF signal. Note that it is unnecessary for the EMS manager 52 to continue sending commands for notching out the identified tone or tones 69. As an example, once the control logic 37 is instructed to notch out a tone or tones 69, the control logic 37 may be configured to continue notching out such tone or tones 69 until it receives another command instructing it to control the tone or tones 69 in another manner.

At around 6:00 P.M., the interference value calculated in block 101 should fall below the specified threshold such that a "no" determination is made in block 102. Thus, the EMS manager 52 refrains from restricting the tones 69 of the DMT signal, as shown by block 104. To achieve block 104 when the control logic 37 is currently notching out a tone or tones 69 based on the interferer 30, the EMS manager 52 may transmit a command to the network access device 20 instructing it to refrain from notching out the tone or tones 69 previously notched out in block 108 for the same interferer 30. In response, such the control logic 37 controls the transceiver 35 such that the identified tone or tones 69 are no longer notched out. Accordingly, the tone or tones 69 are notched out only when RF interference from the interferer 39 is expected to be significant, as indicated by the comparison of the calculated interference value to the threshold, thereby mitigating the effects of the interferer 30 on signal quality.

As described above, it is possible for other types of adjustments to be made to the tone or tones 69 affected by the interference from the interferer 30. As an example, rather than notching out the affected tone or tones 69, such tone or tones 69 may be modified to carry less data when there is significant RF interference expected. Yet other adjustments are possible in other embodiments.

In addition, the EMS 15 may be configured to control any number of network devices according to the techniques described herein. For example, for a particular interferer 30, the EMS 15 may identify each network device that is in close proximity to the interferer 30 such that a significant amount of RF interference is introduced by the interferer 30 to the signals transmitted by the identified devices. The EMS 15 may then control (adjust one or more tones) the signals transmitted by the identified devices in order to mitigate for an effect of the RF signal to such transmitted signals, as described herein.

Now, therefore, the following is claimed:

1. A communication system, comprising:
   a transceiver coupled to a subscriber line and configured to transmit a discrete multitone (DMT) signal having a plurality of tones across the subscriber line;
   memory for storing interferer data, the interferer data indicative of a location of a radio frequency (RF) interferer and a frequency of an RF signal transmitted by the RF interferer; and
   logic configured to adjust a data rate of at least one of the tones based on the interferer data thereby mitigating for an effect of the RF signal on the DMT signal transmitted by the transceiver.

2. The communication system of claim 1, further comprising an element management system (EMS) configured to make a determination based on the interferer data whether the RF signal is expected to significantly interfere with the DMT signal transmitted by the transceiver, the EMS configured to transmit a control signal for controlling the transceiver through a network based on the determination.

3. The communication system of claim 1, wherein the logic is configured to perform a comparison between a location of the transceiver and the location indicated by the interferer data and to control the DMT signal transmitted by the transceiver based on the comparison.

4. The communication system of claim 1, wherein the logic is configured to adjust a transmission mask for the transceiver based on the interferer data.

5. The communication system of claim 1, wherein the interferer data indicates a transmit power for the RF interferer.

6. The communication system of claim 5, wherein the logic is configured to calculate, based on the interferer data, a power level of the RF signal affecting the DMT signal transmitted by the transceiver.

7. The communication system of claim 1, wherein the interferer data indicates a schedule of transmit powers for the RF interferer.

8. The communication system of claim 1, wherein the logic is further configured to perform a comparison between a threshold and an interference value indicative of an estimated amount of interference from the RF signal affecting the DMT signal transmitted by the transceiver, and wherein the logic is configured to control the DMT signal transmitted by the transceiver based on the comparison.

9. The communication system of claim 1, wherein the RF signal is a wireless RF signal.

10. The communication system of claim 1, wherein the interferer data indicates geographic coordinates of the RF interferer.

11. The communication system of claim 1, wherein the interferer data indicates a distance of the RF interferer from the transceiver.

12. A communication system, comprising:
    a network access device having a transceiver configured to transmit a discrete multitone (DMT) signal via a subscriber line;
    memory for storing interferer data indicative of a location of a radio frequency (RF) interferer and a frequency of an RF signal transmitted by the RF interferer; and
    an element management system (EMS) coupled to the network access device, the EMS configured to automatically determine whether the RF signal is expected to significantly interfere with the DMT signal based on the interferer data, the EMS further configured to transmit a control signal through a network to the network access device in response to a determination by the EMS that the RF signal is expected to significantly interfere with the DMT signal,
    wherein the network access device is configured to control a data rate of at least one tone of the DMT signal based on the control signal.

13. The communication system of claim 12, wherein the interferer data indicates a schedule of transmit powers for the RF interferer.

14. A communication system, comprising:
    a network access device having a transceiver configured to transmit a discrete multitone (DMT) signal via a subscriber line;
    memory for storing interferer data indicative of a location of a radio frequency (RF) interferer and a frequency of an RF signal transmitted by the RF interferer, and
    an element management system (EMS) coupled to the network access device, the EMS configured to automatically determine whether the RF signal is expected to significantly interfere with the DMT signal based on the interferer data the EMS further configured to transmit a control signal through a network to the network access device in response to a determination by the EMS that the RF signal is expected to significantly interfere with the DMT signal,
    wherein the network access device is configured to notch out at least one tone of the DMT signal based on the control signal.

15. A method, comprising the steps of:
    storing interferer data indicative of a location of a radio frequency (RF) interferer and a frequency of an RF signal transmitted by the RF interferer;
    transmitting a discrete multitone (DMT) signal having a plurality of tones across a subscriber line; and
    adjusting a data rate of at least one of the tones of the DMT signal transmitted across the subscriber line based on the interferer data such that an effect of the RF signal on the signal transmitted across the subscriber line is mitigated.

16. The method of claim 15, further comprising the step of comparing a location associated with the DMT signal transmitted across the subscriber line and the location indicated by the interferer data, wherein the controlling step is based on the comparing step.

17. The method of claim 15, wherein the controlling step comprises the step of adjusting a transmission mask of a transceiver based on the interferer data.

18. The method of claim 15, wherein the interferer data indicates a transmit power for the RF interferer.

19. The method of claim 18, further comprising the step of calculating, based on the interferer data, a power level of the RF signal affecting the DMT signal transmitted across the subscriber line, wherein the controlling step is based on the power level.

20. The method of claim 15, wherein the interferer data indicates a schedule of transmit powers for the RF interferer.

21. The method of claim 15, further comprising the step of determining whether the RF signal is expected to significantly interfere with the DMT signal transmitted across the subscriber line, wherein the controlling step is based on the determining step.

22. The method of claim 15, further comprising the step of comparing a threshold and an interference value indicative of an estimated amount of interference from the RF signal affecting the DMT signal transmitted across the subscriber line, wherein the controlling step is based on the comparing step.

23. The method of claim 15, wherein the RF signal is a wireless RF signal.

24. The method of claim 15, wherein the interferer data indicates geographic coordinates of the RF interferer.

25. The method of claim 15, wherein the transmitting step is performed by a transceiver coupled to the subscriber line, and wherein the interferer data indicates a distance of the RF interferer from the transceiver.

26. A method, comprising the steps of:

storing interferer data indicative of a location of a radio frequency (RF) interferer and a frequency of an RF signal transmitted by the RF interferer;

transmitting a DMT signal having a plurality of tones across a subscriber line; and notching out at least one of the tones based on the interferer data such that an effect of the RF signal on the DMT signal transmitted across the subscriber line is mitigated.

27. A communication system, comprising:

a transceiver coupled to a subscriber line and configured to transmit a discrete multitone (DMT) signal having a plurality of tones across the subscriber line;

memory for storing interferer data, the interferer data indicative of a location of a radio frequency RF interferer and a frequency of an RF signal transmitted by the RF interferer; and logic configured to notch out the at least one tone based on the interferer data thereby mitgating for an effect of the RF signal on the DMT signal transmitted by the transceiver.

* * * * *

UNITED STATES PATENT AND TRADEMARK OFFICE
CERTIFICATE OF CORRECTION

PATENT NO.          : 8,855,177 B1
APPLICATION NO.     : 12/950377
DATED               : October 7, 2014
INVENTOR(S)         : Arlynn Wayne Wilson, Kent E. Darzi and Philip David Williams It is certified that error appears in the above-identified patent and that said Letters Patent is hereby corrected as shown below:

In the Claims

Column 10, Line 38, Claim 14: Replace "interferer data the EMS further configured to transmit a" with -- interferer data, the EMS further configured to transmit a --

Signed and Sealed this
Seventeenth Day of February, 2015

Michelle K. Lee
*Deputy Director of the United States Patent and Trademark Office*